United States Patent [19]
Smith et al.

[11] 3,796,335
[45] Mar. 12, 1974

[54] BUCKET POSITION INDICATOR

[75] Inventors: Spencer E. Smith, Westmont; Donald C. Marek; Walter F. Klaviter, both of Hickory Hills, all of Ill.

[73] Assignee: International Harvester Company, Chicago, Ill.

[22] Filed: Jan. 14, 1972

[21] Appl. No.: 217,908

[52] U.S. Cl. ............................ 214/761, 116/124 R
[51] Int. Cl. ................................................ E02f 3/86
[58] Field of Search ........... 214/761, 762, 763, 764; 116/DIG. 13, 124 R, 124 F

[56] References Cited
UNITED STATES PATENTS

| | | | |
|---|---|---|---|
| 3,187,913 | 6/1965 | Strader | 214/761 |
| 3,251,492 | 5/1966 | Kampert | 214/761 |
| 3,347,398 | 10/1967 | Smith | 214/761 |
| 3,275,174 | 9/1966 | Konefes | 214/761 |
| 3,443,705 | 5/1969 | Buttram | 214/761 |

*Primary Examiner*—Gerald M. Forlenza
*Assistant Examiner*—John Mannix
*Attorney, Agent, or Firm*—John A. Schaerli; Floyd B. Harman

[57] ABSTRACT

An implement position indicator having a lost motion cam following extension connected to a pivotally based wedge shaped cam. The wedge shaped cam being timed to sweep out a certain arc, in response to horizontal movement by the extension, the amount of sweep being measured on a calibrated gauge, each calibration corresponding to an implement position.

7 Claims, 6 Drawing Figures

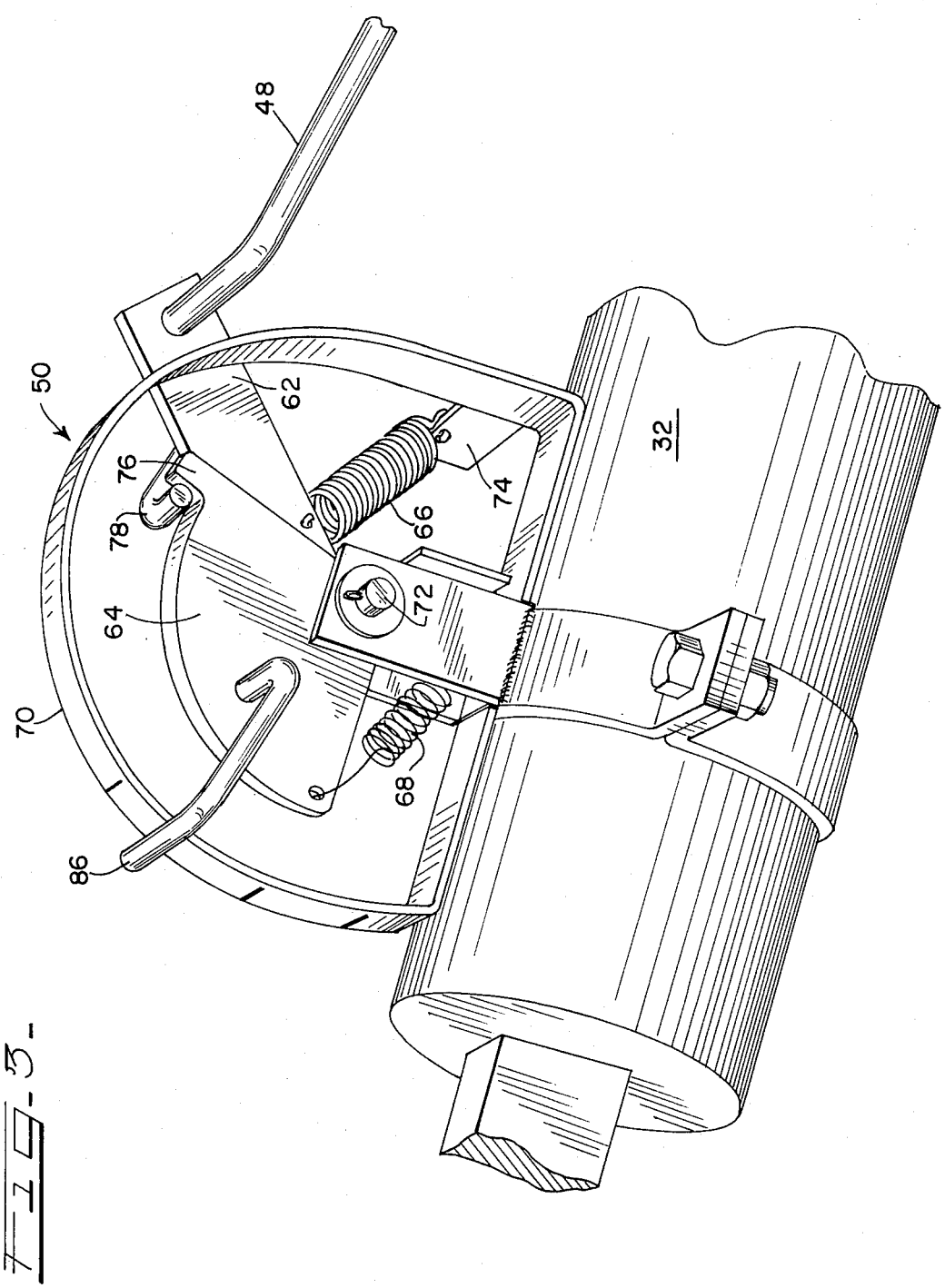

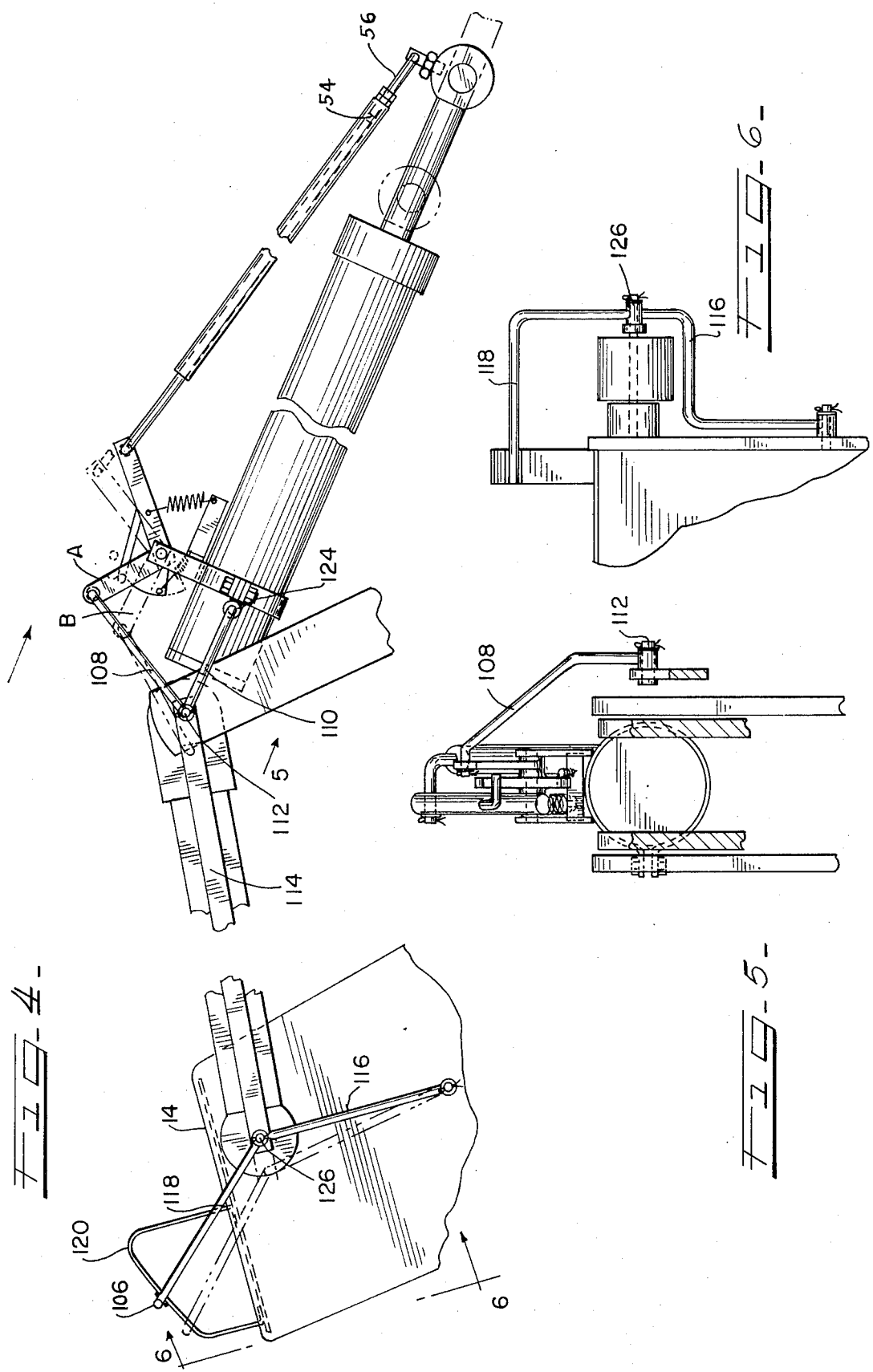

3,796,335

1

BUCKET POSITION INDICATOR

BACKGROUND OF THE INVENTION

This invention relates to an indicating means for showing the position of an implement which is mounted on a vehicle or the like, and more particularly to a mechanical mechanism having a lost motion cam or telescoping bucket following extension and a second cam in combination, such that horizontal movement of the extension is translated by the second cam into radial movement displayed on a calibrated gauge.

It is well known in the prior art to provide loaders with devices for indicating the loader bucket's position in relationship to the loader boom. Such devices relieve the operator of the necessity of constantly maintaining visual contact with the bucket and thereby forcing division of his attention from control levers, the vehicle position, work face etc. However, these indicating devices have generally been constructed of mechanical or hydraulic means which are expensive, delicate and subject to wear and abrasion. Further, such devices are not adjustable such as to respond only to particular bucket positions, rather they measure the full cycles, nor are they adaptable to different types of calibration gauges.

SUMMARY OF THE INVENTION

An indicating device is disclosed herein, namely, a mechanical mechanism which is adjustable to measure certain parts of the travel of the implement actuating hydraulic means, as the bucket passes through a complete cycle. That is, an indicator which allows the operator to set the bucket in a position such that when it touches the ground, it will be level therewith. The determination can be achieved when the boom etc. is in any position above the ground, the indicator reading the bucket position independently of the boom or boom linkage.

An object of the present invention is to provide a convenient bucket position indicator being clearly visible for indicating the position of a tiltable material handling implement on a vehicle mounted power loader.

It is a further object to provide a novel bucket position indicator adaptable to several modes of reading.

It is still another object to provide a novel indexing means which is easily manually adjustable to provide readings on various bucket positions.

Another object is to provide an indicator which is manually adjustable to provide effective readings over the range of implement positions.

Yet another object is to provide an indicator device of inexpensive and simple design easily furnished as original equipment or later installed as an attachment on a power loader.

Other objects and features of the invention will be apparent upon a consideration of the following specifications and drawings in which:

BRIEF DESCRIPTION OF THE DRAWINGS

FIG. 3 is an enlarged partial view of the indicator means of FIG. 1 for indicating the position of the bucket;

2

Figure 1:
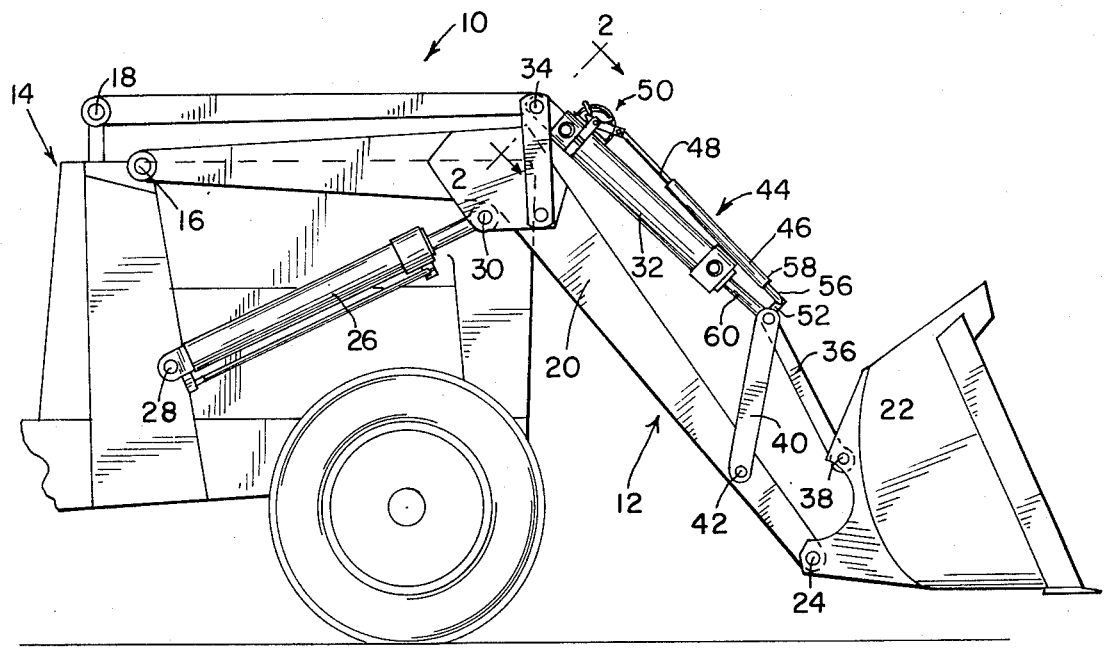
FIG. 1 is a side elevation showing the invention mounted on the boom.

FIG. 4 is a partial side view showing the indicator device of the instant invention mounted in association with the boom hydraulic cylinder and another position translational means or embodiment;

FIG. 5 is an enlarged cross-sectional view taken on line 5—5 of FIG. 4 showing details of the construction of the position translating means; and FIG. 6 is an enlarged cross-sectional view taken on line 6-6 of FIG. 4 showing further details of the construction of the position translating means as mounted in the cab of the vehicle.

The present embodiment is the preferred embodiment but it is to be understood that changes can be made therein by one skilled in the art without departing from the spirit and scope of the present invention.

DESCRIPTION OF THE PREFERRED EMBODIMENT

Referring now to the drawings, 10 indicates a tractor as is well known in the art, having a loader 12 attached thereto. The tractor 10 includes an operator's station seat and steering wheel (all not shown) and a dash 14.

The loader 12 is pivotally attached to tractor 10 at pivot points 16 and 18 and further includes boom arm 20 and bucket 22, said bucket is pivotally attached to the boom arm 20 at pivot point 24. An implement actuating hydraulic means or hydraulic cylinder 26 is pivotally connected to the tractor as at 28 and pivotally connected to the boom arm 20 as at 30. This hydraulic means 26 provides the lifting and lowering movement to the boom arm 20 and bucket 22. Another implement actuating hydraulic means or hydraulic cylinder 32 is pivotally connected to the boom arm 20 as at 34 and is pivotally connected to the bucket 22 through line 36 at 38 and to the boom arm 20 through tension link 40 pivotally at 42. Cylinders 26 and 32 are actuated by controls well known in the art. Actuation of cylinder 32 will cause movement of bucket 22 relative to boom arm 20 and thus change the angular relation between arm 20 and bucket 22, as well as provide control of the bucket position relative to the ground.

The foregoing description illustrates a tractor loader as is well known in the prior art and no further description is deemed necessary.

Referring now to the novel portion of this invention, as illustrated in FIG. 1, generally shown at 44. The telescoping or sliding position indicating means 44 comprises a lost motion means and includes a telescoping sleeve means 46, a telescoping rod means 48 and a position translating means 50. The base or tab means 52 for motion in energizing the system is fixedly mounted on the rod side of the bucket cylinder 32. Pivotally secured thereto by a suitable means such as bolt and cotter pin, is a link means 56 which threadedly engages the end 58 of telescoping sleeve 46. Link means 56 may be of substantial length having threading extending therealong such that it may be screwed into telescoping sleeve 58 and function as an adjustable stop against the free sliding movement of rod 48.

In operation, loader bucket 22 rotates about pivot point 24 on boom arm 20. When the operator actuates hydraulic ram 32, the telescoping indicating means and the bucket assumes a corresponding position. That is, as the hydraulic piston 60 of cylinder 32 is extended to place the bucket 22 in a dump position, the telescoping means 46 will extend in following relationship. Correspondingly when the bucket is in a carry position, piston 60 will be in a retracted position and so must be the telescoping means 46. Since the distance through which piston 60 may be retracted and extended is great, it is apparent that the telescoping rod will slide freely through a substantial distance of telescoping sleeve means 46. Thus, depending upon the bucket position which the operator wishes to monitor, he screws tension link 56 into or out of sleeve 46, so changing the location at which end 54 thereof engages the telescoping rod 48, causing resulting movement to be transferred to position translating means 50. Thus, it is apparent that the operator may be simple manual adjustment vary the bucket indicator means so as to monitor different bucket positions over the entire cycle. It should be noted, however, to measure positions near the full extension of rod 60, a larger translating means 50 must also be provided. It is obvious that if the telescoping parts 46 and 48 and link 56 were of solid construction, a member of substantial length would be involved. As will hereafter be indicated, a translating device of some large undesirable size would also be involved.

As more fully disclosed in FIG. 3, the position translating means 50 includes an input indicator lever or arm means 62, cam indicator member 64, a return means or spring 66, an extension or torsion spring means 68 and an indicator gauge means 70 all mounted around a pivot point 72.

In operation, the telescoping rod 48 is pivotally mounted on indicator input lever 62 such that when the base of the rod 48 contacts the link 56 in telescoping sleeve 46, arresting further free sliding movement thereof, any subsequent distance changes of piston 60 are transferred to arm 62. The force being transferred causes arm 62 to overcome the return means or spring 66 and pivot around point 72. AS it is apparent spring 66 lockingly stabilizes lever 62 when rod 48 is sliding freely in sleeve 46. The spring means 66 is secured to lever 62 by any suitable means and can be secured to a tab 74 projecting off the indicator gauge 70 or could be secured to the cylinder 32 itself.

The indicator means 64 is in following contact with the arm 62, pivoting around point 72, nd being fashioned to translate horizontal motion from the rod 48 into radial motion.

Figure 2:
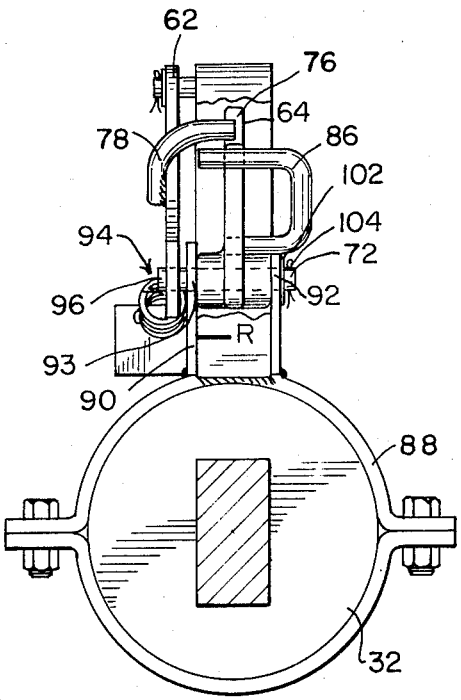
FIG. 2 is an enlarged partial cross-sectional view of the structure shown in FIG. 1 along lines 2—2.

Indicator 64 is of pie shaped dimensions and carries one half of an abutting means, the other half being carried by input lever 62. The abutting means as shown is comprised of a tab member 76 in abutting contact with a hook shaped means 78 which projects out of the lever arm 62. The tab 76 and hook 78 are maintained in abutting contact by extension or torsion spring 68, being secured to the indicator and to a suitable base position. Extending out from indicator 64 is a bracket means or, as shown in FIG. 2 an elongated U-shaped member 86, being timed, as is the indicator 64, to translate horizontal motion into radial motion. It is apparent that if the distance through which rod 60 moves, once link 56 has engaged telescoping rod means 48, is greater than can be translated by indicator means 64, hook means 78 simply passes by tab means 76 and continues to pivot around pivot point 72. Thus, a means other than the telescoping rod and sleeve means is provided whereby rod motion can be lost without destruction of any mechanical features of the assembly.

The pivot point means 72 is comprised of a clamp 88 secured around cylinder 32, a rectangular bracket 90 welded to clamp 88, having a transversely disposed opening 92 and 93 provided with a bolt or pin and cotter pin means 94. As is shown in FIG. 2, the bolt or pin 96 of means 94 is firmly connected to the input indicator arm 62, and journals in order the bracket 90, the indicator 64, the bracket 90, a washer 102 and is secured by the cotter pin means 104. It is apparent that any pivot means so functioning could be suitably adapted, this being simply the preferred embodiment.

Thus, referring to FIG. 3, as arm 62 overcomes spring 66 and pivots around point 72, spring 68 maintains tab 76 in abutting relationship with hook 78 causing bracket 86, through indicator 64 to sweep out an angle proportional to the horizontal movement of rod 48. By the incorporation of a suitably marked member such as indicator gauge 70, the operator can determine the position of the bucket by the relationship of bracket 86 to said gauge. As was stated previously, link 56 can be adjusted to change the arresting point of rod 48 to correspond to a different bucket position. Thus, if the operator desires to maintain or know the position of the bucket, he adjusts tension link 56 such that bracket 86 responds thereto. It is then a simple matter to mark the gauge 70 to correspond to the position.

Shown in FIGS. 4, 5 and 6 is another embodiment of indicator gauge 70, which transfers by mechanical means the radial sweep of bracket means 86 to a dash 14 mounted indicator means 106. Referring to FIG. 4, the dash mounted indicator 106 includes a bracket link means 108, a clamp link means 110, a pivot point 112, a shaft means 114, a pivoting tension link means 116, an indicator link means 118 and a gauge means 120.

In operation, the bracket tension link 108 is in pivotal contact with shaft 114 and clamp tension link 110 at point 112 and with bracket 86 at point 112. The clamp tension link 110 pivots at point 124 located on clamp 88 as bracket 86 moves from position A to phantom position B. The indicator link 118 being fixed at point 126 to shaft 114 moves correspondingly, indicating a different bucket position on the gauge 120.

Having described the invention what is considered new and desired to be protected by Letters Patent is:

1. An implement position indicator device for determining implement position from implement actuating hydraulic means movement comprising:

sliding means having an elongated body portion means and a first and a second end;

tension link means engaging said second end of said sliding means and being fixed to said implement actuating hydraulic means;

rod means slidingly engaging said sliding means, whereby only at certain points of the work cycle of said implement actuating hydraulic means does said rod means abut against said tension link means;

movement translation means connected to said rod means in following relationship whereby movement of said implement actuating hydraulic means, after said rod means abuts against said tension link means, is gauged.

2. An implement position indicator device for determining implement position from implement actuating hydraulic means movement comprising:

sliding means being a hollow sleeve having a first and a second end;

tension link means threadingly engaging said second end of said sliding means and being fixed to said implement actuating hydraulic means, said tension link being extendable a substantial distance into said sliding means;

rod means slidingly engaging said second end of said sliding means; and movement translation means connected to said rod means in following relationship whereby movement of said implement actuating hydraulic means is gauged.

3. The implement position indicator device of claim 2 wherein said rod means slidingly journals said sleeve means in a telescoping manner until restriction by said tension link means, whereby causing said rod to follow said implement actuating hydraulic means.

4. The implement position indicator device of claim 1 wherein said moment translation means comprises:

input means fixed to said rod means;

indicator means being in abutting contact with said input means; and a gauge means, said indicator means translating movement of said implement actuating hydraulic means into movement measured on said gauge.

5. The implement position indicator device of claim 4 wherein spring means maintain said input means and said indicator means in abutting relationship whereby providing a lost motion device.

6. The implement position indicator device of claim 1 wherein said gauge is mounted on a tractor dash.

7. A bucket position indicator device for determining bucket position from the bucket actuation hydraulic means comprising:

a hollow sleeve having a first and second end, a tension link engaging said first end, a rod journalling said second end in sliding relationship with said sleeve, a movement translation means including an input lever means being in abutting contact with an indicator means and in pivotal contact with said rod, said indicator translating horizontal movement from said rod into said radial movement measure on a gauge, horizontal movement being generated only when during that portion of the work cycle of the hydraulic means when said rod means slidingly abuts said tension link means.

* * * * *